Aug. 11, 1925.

P. S. WARD 1,548,919

COMBINED MIXING AND KITCHEN MACHINE

Filed Oct. 23, 1922 4 Sheets-Sheet 1

Inventor:
Paul S. Ward,
His Attorney.

Aug. 11, 1925. 1,548,919
P. S. WARD
COMBINED MIXING AND KITCHEN MACHINE
Filed Oct. 23, 1922 4 Sheets-Sheet 2

Inventor:
Paul S. Ward,
by his Attorney

Aug. 11, 1925.

P. S. WARD

COMBINED MIXING AND KITCHEN MACHINE

Filed Oct. 23, 1922

Inventor:
Paul S. Ward,
his Attorney.

Aug. 11, 1925.

P. S. WARD 1,548,919

COMBINED MIXING AND KITCHEN MACHINE

Filed Oct. 23, 1922    4 Sheets-Sheet 4

Inventor:
Paul S. Ward,

Patented Aug. 11, 1925.

1,548,919

UNITED STATES PATENT OFFICE.

PAUL S. WARD, OF CINCINNATI, OHIO, ASSIGNOR TO THE TRIUMPH MANUFACTURING COMPANY, OF CINCINNATI, OHIO, A CORPORATION OF OHIO.

COMBINED MIXING AND KITCHEN MACHINE.

Application filed October 23, 1922. Serial No. 596,298.

*To all whom it may concern:*

Be it known that I, PAUL S. WARD, a citizen of the United States, residing at Cincinnati, in the county of Hamilton and State of Ohio, have invented certain new and useful Improvements in Combined Mixing and Kitchen Machines, of which the following is a specification.

It is the object of my invention to provide novel means as a single structure for mixing dough or ingredients and for cutting or disintegrating food or ingredients for food; further, to provide novel arrangement of means for driving the same; further, to provide novel means whereby to position a bowl for having dough mixed therein and for receiving the cut or disintegrated particles; further, to provide novel means whereby the operations for mixing dough and for cutting or disintegrating the food or food ingredients take place while a bowl is in low position for ready observance of the operations; and the inventon will be further readily understood from the following description and claims, and from the drawings, in which latter:

Figure 1:
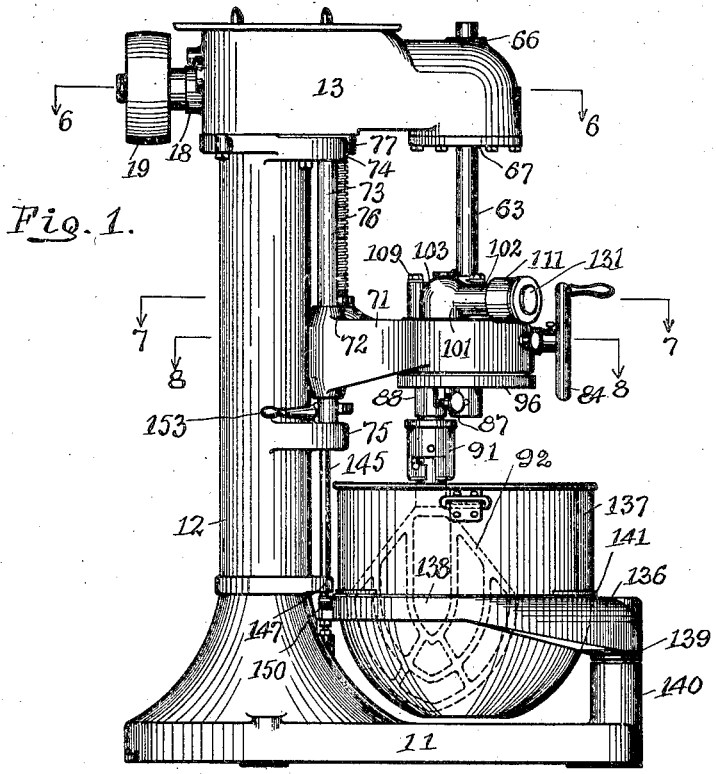
Fig. 1 is a side elevation of my improved device arranged for mixing dough.

The frame of the machine comprises a base 11, from which a column 12 extends upwardly. Speed changing mechanism is exemplified in a gear-casing 13 at the top of the column. The speed changing mechanism may be of suitable type, and is exemplified as comprising a drive-shaft 15 journaled in a bearing 16 in the casing and in a hub 17, in turn journaled in a bearing 18 in the casing. A suitable driving member, shown as a pulley 19, is secured to the hub 17.

A nest of gears 21, 22, 23, 24, of different diameters, secured together, has spline-key and groove connection 25 with the shaft 15. A clutch, which may be of suitable construction, and is shown as a tooth-clutch 26, is located between the driving member and the shaft 15, for transmitting power from the initial driving member to said shaft, or interrupting said transmission. A fork 27 is received in an annular groove 28 in the movable member 29 of the clutch for actuating or releasing the clutch. The movable member has suitable spline-key and groove connection 30 with the shaft 15. An arm 31 is articulated with the fork, and is fast on a rocker-rod 32, journaled in a bearing 33. An operating arm 34 is fixed to said rod and is arranged to shift the fork, being provided with a suitable latch 35 for holding the fork in shifted relation.

A nest of gears 41, 42, 43, 44, of different diameters, is fixed to a shaft 45, journaled in bearings 46, 47, in the casing. The nest of gears 31, 32, 33, 34, is shiftable endwise on the shaft 15 by means of a fork 48 received in an annular groove 49 in said nest of gears. An arm 50 has articulating connection 51 with said fork and is fast to a rocker-rod 52, journaled in a bearing 53 in the casing. An operating arm 54 is fixed to said rocker-rod, and is provided with a latch 55, the pin of which is arranged to engage any one of a suitable number of holes 56 in the casing for holding the movable nest of gears in neutral position or for meshing relation of its respective gears with the respective gears of the mating nest of gears on the shaft 45 for idle relation of said shaft 45 or for imparting various speeds thereto. The latch 35 may be similar in construction to the latch 55.

The shaft 45 has a bevel-pinion 61 fast thereon, meshing with a bevel-gear 62. An upright shaft 63 has spline-key and groove connection 64 with said bevel-gear, and is journaled in bearings 66, 67, in said casing, for permitting up and down axial movements of said upright shaft while maintaining driving connection with said bevel-gear throughout said movements. This upright shaft forms the drive-shaft for the planetary bearing member and the kitchen machine hereinafter described.

A bracket 71 extends from the frame. It is exemplified as a slide adjustable up and down on the frame, as by providing the same with bearings 72, received about rods 73, fixed in bearings 74, 75, in the frame. A screw-rod 76 is fixed to the frame in a bearing 77. A bevel-gear 78 is journaled and held in endwise relation in a bearing 79 in the slide. The bevel-gear 78 is threaded to the screw-rod, as shown at 80. A bevel-pinion 81 meshes with the bevel-gear, and is fixed to an adjusting shaft 82 journaled in bearings 83 in the slide. A hand-wheel 84 fixed to the shaft 82 is provided for adjusting the slide up and down.

The upright shaft 63 is journaled in a bearing 86 in the bracket. A planetary bearing-member 87 is fixed to the shaft and comprises a bearing 88. An upright shaft 89 is journaled in this bearing and has a pinion 90 fixed to its upper end and a connecting part 91 for a dough-beater or whip 92 at its lower end. These dough-beaters or whips may be of various forms and interchangeable. The connection between the dough-beater and the shaft 89 is shown as a releasable bayonet-pin and slot connection 93.

The pinion 90 meshes with an internal gear 95, shown as part of the bracket. The planetary bearing-member is also shown as comprising a shelf 96, forming a drip-shelf for oil to prevent the latter mixing with the contents of the bowl.

A bearing-member 101 comprises a bearing 102, and may have a hood 103 about the shaft 63. The shaft 63 has a spiral gear 104 fast thereon, which meshes with a spiral gear 105 under said hood. The spiral gear 105 is fast on the inner end of a laterally extending shaft 108 journaled in the bearing 102. The bearing-member is fixed to the bracket by bolts 109.

The bearing 102 is shown as an elongated bearing provided with a socket 111 at its outer end, and the shaft 108 is shown as a hollow shaft provided with a socket 112, square in cross-section, at its outer end, within the socket 111.

A cutting or disintegrating device 115 is provided for cutting or disintegrating food or ingredients of food, such as meat, nuts, fruits, baked materials, butter, shortening and other products, and is hereinafter referred to as a kitchen machine. It is exemplified as comprising a feed-tube 116, in which there is a feed-worm 117. The material to be operated upon is placed into a hopper 118, and is fed by the worm through a suitable dividing plate 119, releasably secured by a cap 120, threaded to the outer end of the tube, and provided with a discharge opening 121. The dividing plate is provided with holes 122 of suitable diameter for the material operated on and the sizes of the desired divided product, plates having holes of different sizes according to the desired result, being employed.

Figure 9:
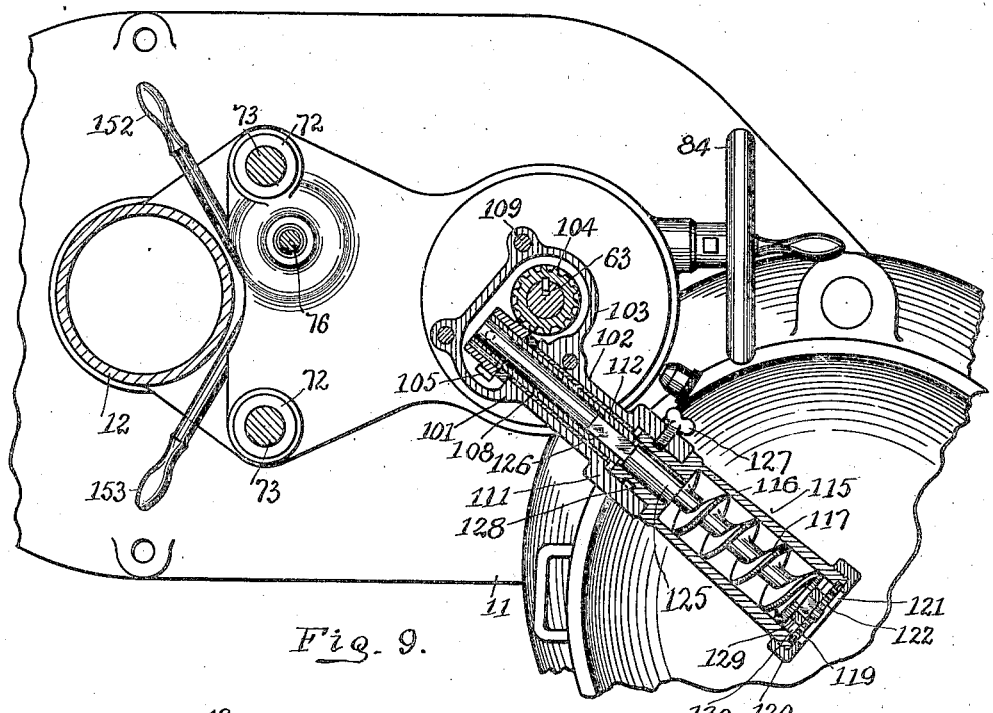
Fig. 9 is a horizontal section of the same taken on the line 9—9, of Fig. 3; and, Fig. 10 is a vertical section of a detail, taken in the plane of the line 10—10, of Fig. 8.
Figure 10:
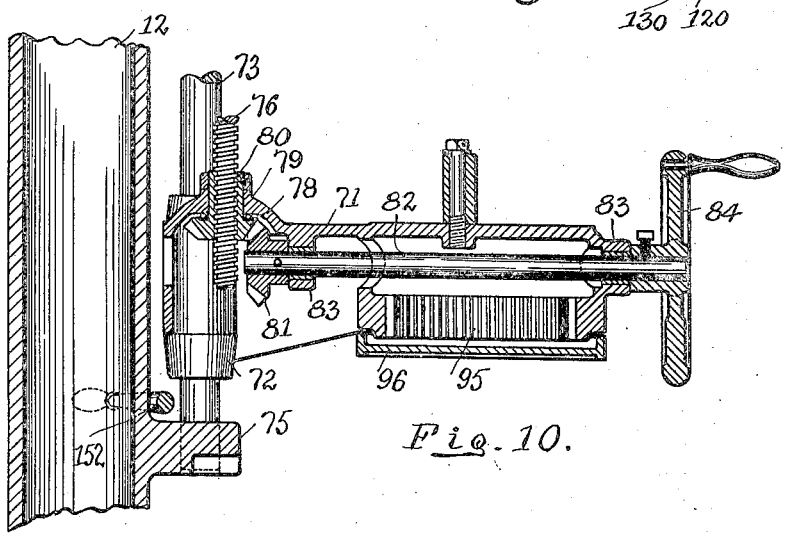

The kitchen machine is preferably releasable. Its tube is provided with a shank 125 which fits the socket 111, and its worm 117 is preferably provided with a stem 126 which is of cross-sectional shape to enter and to fit the socket 112 so as to be rotated by the shaft 108. A retaining bolt 127, shown as a wing-bolt, is threaded in the wall of the socket 111, the inner end of the bolt being arranged to enter an annular slot 128 in the shank 125. The kitchen machine is readily attached by slipping its shank 125 into the socket 111, whereby the stem 126 of the worm 117 is also received in the socket 112 of the shaft 108 for forming drive connection therewith, the parts being fixed in this relation by the bolt 127, as shown in Fig. 9. The worm 117 is journaled in the shank 125 at one end, and in a bearing 129 of a spider 130 at its other end.

If it is desired to remove the kitchen machine, the bolt 127 is unthreaded to release the shank 125, and the kitchen machine withdrawn. A rod may be readily driven through the hollow shaft, against the inner end of the stem 126, in case ready release is not otherwise obtained.

Figure 7:
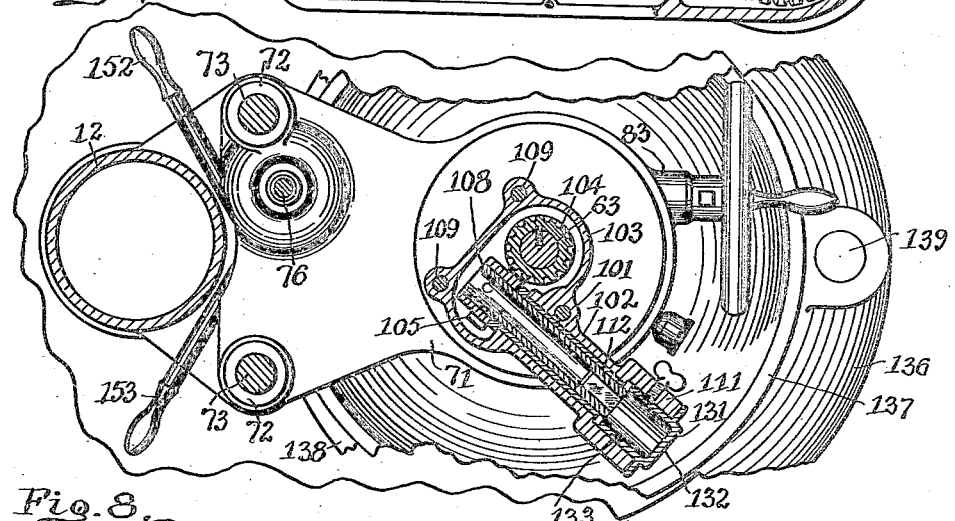
Fig. 7 is a horizontal section of the same taken on the line 7—7, of Fig. 1.
Figure 8:
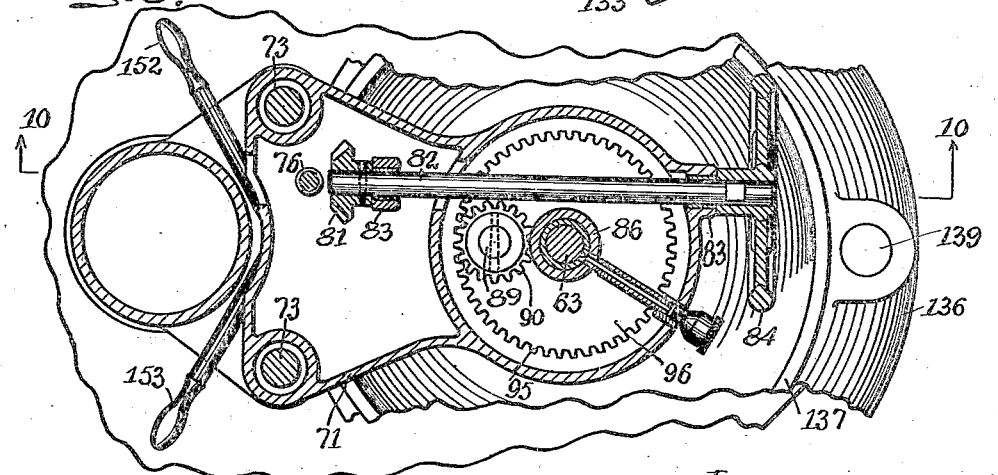
Fig. 8 is a horizontal section of the same taken on the line 8—8, of Fig. 1.

A plug 131 is preferably substituted for the shank of the kitchen machine in the socket 111 when the kitchen machine is withdrawn, as shown in Fig. 7. This plug is preferably hollow at its inner end so as to have no connection at its inner end with the shaft 108, which normally rotates. The plug is provided with a closed outer stationary wall 132, and with an annular groove 133, in which the inner end of the bolt 127 is received for fastening the plug in place.

The upright shaft 89 has a planetary movement at the front of the column. The shaft 108 preferably extends to the side of the position of the path of the upright shaft 89. It is shown positioned with its axis of rotation in a line parallel to a line tangent to the upright shaft 63. The outer end of the laterally extending shaft and the discharge opening of the kitchen machine are spaced from the path of the beater-shaft in vertical arrangement.

Figure 2:
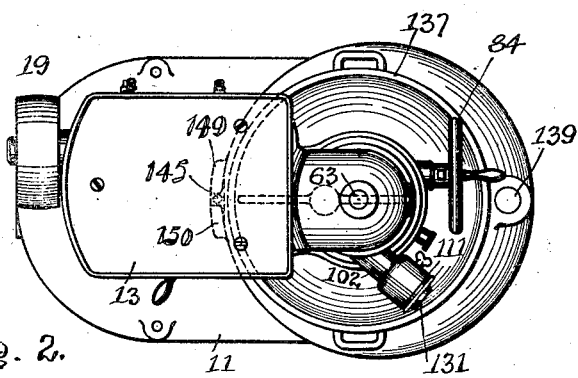
Fig. 2 is a plan view of the same.
Figure 3:
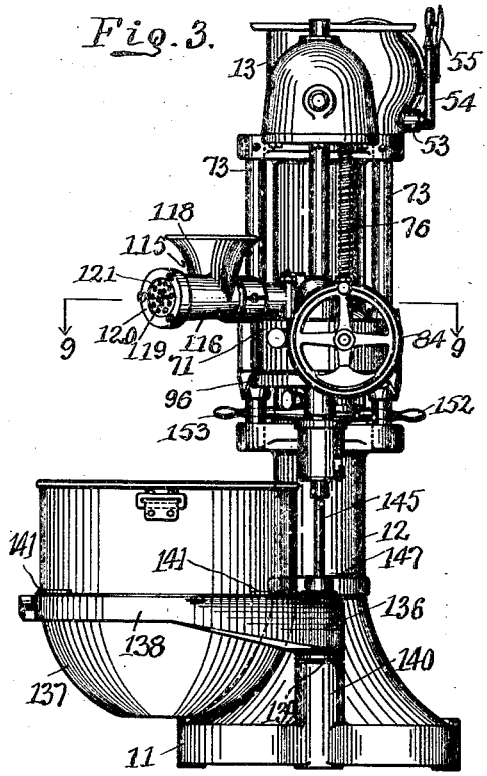
Fig. 3 is a front elevation of my improved device arranged for disintegrating food.
Figure 5:
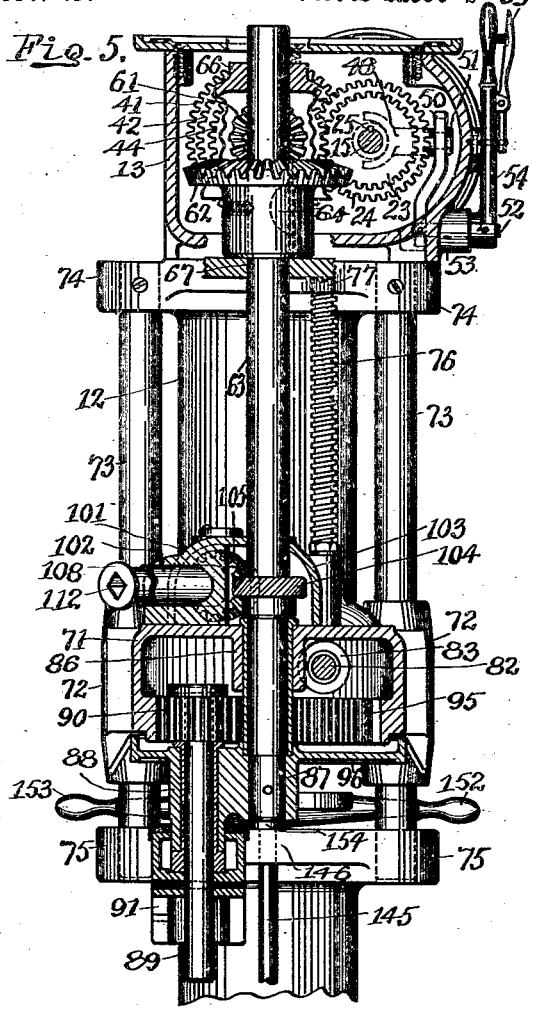
Fig. 5 is a central vertical axial section, showing the drive relation for the dough mixing and disintegrating parts, taken on the line 5—5, of Fig. 4, and with the front end of the gear-casing removed.
Figure 4:
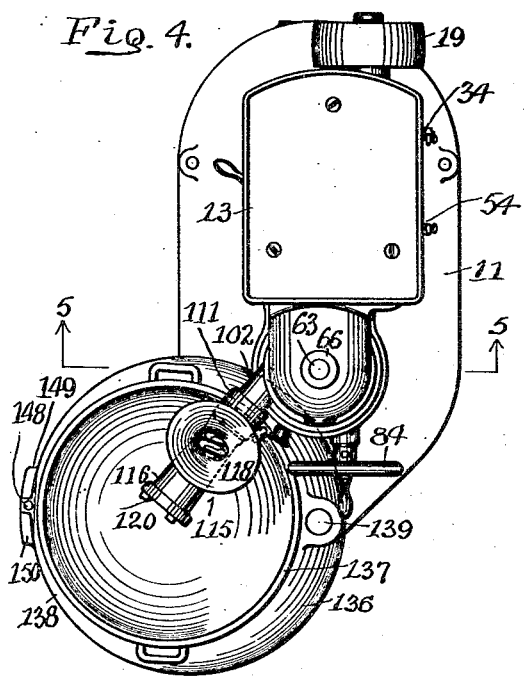
Fig. 4 is a plan view of the same.
Figure 6:
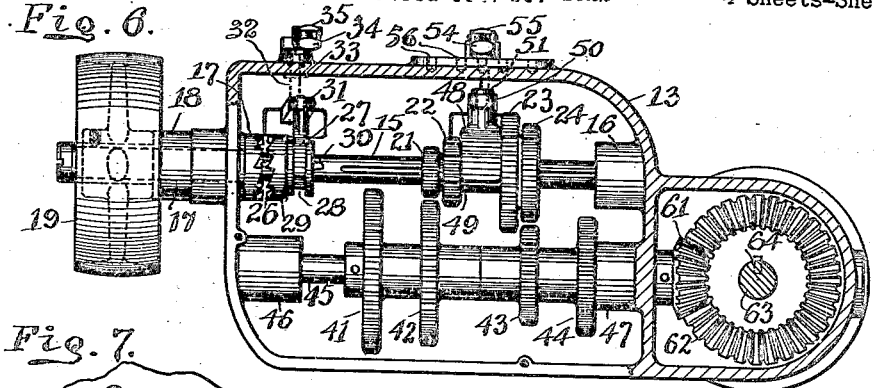
Fig. 6 is a horizontal section of my improved device taken on the line 6—6, of Fig. 1.

A bowl-support 136 is shiftable laterally for placing a bowl 137 thereon under the path of the beater-shaft 89, as shown in Figs. 1 and 2, or under the outer end of the kitchen machine, as shown in Figs. 3 and 4. The bowl-support is exemplified as comprising a ring 138 in which the bowl is received, and a pivot-stud 139 received in a bearing 140 in the base 11. The bowl is exemplified as provided with flanges 141 which rest on the ring. The pivot is instanced as located at the front of the bowl. When the bowl is located under the beater-shaft, the beater will turn in and move in an annular path about the inside of the bowl for thoroughly mixing the substance, usually dough, in the bowl, and when the bowl is shifted so as to locate the same under the discharge opening of the kitchen machine, the latter will discharge into the bowl.

The bowl is preferably secured in position when the beater operates therein, accomplished by means of a latch-rod 145 movable axially in bearings 146, 147, the lower end of the latch-rod arranged to enter a notch 148 between riding faces 149, 150, which incline upwardly toward each other on the swinging end of the bowl-ring. When the bowl-ring is swung into beater actuating position from either side, the lower end of the latch-rod will ride upon one of the riding faces and enter the notch when the bowl-ring is in proper position under the beater-shaft The slide 71 may then be lowered for lowering the beater into the bowl.

A handle-member has handles 152, 153, between which there is a hub 154, in which the upper end of the latch-rod is secured. The handles extend to the respective sides of the machine, so that the latch-rod may be raised to release the bowl-support from either side of the machine.

In either position of the bowl, the slide 71 may be lowered, so as to place the operating parts operating on the material in low position for easy, ready and distinct view and inspection by the operator.

The beater-shaft and the shaft for the kitchen machine are operated by a single source of power, a single speed changing gearing affects the speeds of both, and the power of both may be interrupted for speed change by the clutch in advance of the manipulation of the speed change gears, when change of speed is desired owing to different consistencies of the material or change in consistency during manipulation, or different fineness of division or toughness of material being cut, divided or disintegrated.

My improved device forms a ready, compact and simple mechanism for the purposes intended.

It is of course obvious that changes may be made in the mechanism I have prefered to show and describe, without departing from the spirit of my invention within the scope of the appended claims.

Having thus fully described my invention, what I claim as new, and desire to secure by Letters Patent, is:

1. In combination, a supporting column, a gear casing thereon, a depending shaft extending downwardly from said gear casing, a table extending laterally with relation to said column, a kitchen device supported by said table, said kitchen device including an operating shaft having a laterally extending axis of rotation, and driving means between said depending shaft and said operating shaft.

2. In combination, a frame comprising a supporting column, a gear casing thereon, a depending shaft extending downwardly from from said gear casing, a table extending laterally with relation to said column, a kitchen device supported by said table, said kitchen device having a discharge opening, driving means between said depending shaft and said kitchen device, and a bowl supported by said frame in position under said discharge opening of said kitchen device.

3. In combination, a frame comprising a supporting column, a gear casing thereon, a depending shaft extending downwardly from said gear casing, a table extending laterally with relation to said column, a kitchen device supported by said table, said kitchen device having a discharge opening, driving means between said depending shaft and said kitchen device, a bowl, and a movable support for said bowl arranged to position said bowl selectively under said table or under said discharge opening of said kitchen device.

4. In combination, a supporting column, a gear casing thereon, a depending shaft extending downwardly from said gear casing, a table extending laterally with relation to said column, a kitchen device supported by said table, said kitchen device having a discharge opening, driving means between said depending shaft and said kitchen device, a bowl, a movable support for said bowl arranged to position said bowl selectively under said table or under said discharge opening of said kitchen device, and a beater shaft extending below said table and having operative driving connection with said depending shaft and arranged for receiving a beater operative in said bowl when moved under said table.

5. In combination, a frame comprising a supporting column, a gear casing thereon, a depending shaft extending downwardly from said gear casing, a table extending laterally with relation to said column, a kitchen device supported by said table, said kitchen device having a discharge opening, driving means between said depending shaft and said kitchen device, a bowl supported by said frame in position under said discharge opening of said kitchen device, and means for vertically adjusting said table.

6. In combination, a frame comprising a supporting column, a pair of superposed brackets extending laterally with relation to said column, a laterally extending kitchen device supported on the lower one of said brackets and discharging at the side of said lower bracket, an upright shaft extending between said brackets, driving means on said upper bracket for said upright shaft, and driving means on said lower bracket between said upright shaft and said kitchen device.

7. In combination, a frame comprising a supporting column, a pair of brackets extending laterally with relation to said column, an upright shaft between said brackets, driving means on said upper bracket for said upright shaft, a kitchen device on said lower bracket between said pair of brackets, driving means between said kitchen device and said upright shaft, said kitchen device having a discharge opening beyond the edge of said lower bracket, and a bowl support for receiving a bowl under said discharge opening.

8. In combination, a frame comprising a supporting column, a bracket extending laterally with relation to said column, an upright shaft, driving means on the upper end of said column for said upright shaft, a kitchen device on said bracket, driving means between said kitchen device and said upright shaft, said kitchen device having a discharge opening at the side of said lower bracket, and a bowl support for receiving a bowl under said discharge opening.

9. In combination, a frame comprising a supporting column, a bracket supported at an elevation by said frame, an upright shaft in said bracket, driving means at the top of said column for driving said upright shaft, a kitchen device on said bracket comprising a driven shaft and having a discharge opening beyond the outer periphery of said bracket, driving means between the inner end of said driven shaft and said upright shaft, a planetary driven member under said bracket having driven connection with said upright shaft and arranged for receiving a rotary beater under said bracket, a receiving bowl, and means for selectively positioning said receiving bowl under said discharge opening or under said planetary member.

10. In combination, a frame comprising a supporting column, a bracket supported at an elevation by said frame, an upright shaft in said bracket, driving means at the top of said column for driving said upright shaft, a kitchen device on said bracket comprising a driven shaft and having a discharge opening beyond the outer periphery of said bracket, driving means between the inner end of said driven shaft and said upright shaft, a planetary driven member under said bracket having driven connection with said upright shaft and arranged for receiving a rotary beater under said bracket, a receiving bowl, means for selectively positioning said receiving bowl under said discharge mouth and under said planetary member, and means for adjusting said bracket up and down along said column.

11. In combination, a frame comprising a supporting column, a bracket extending therefrom, an upright shaft journaled therein, driving means at the upper end of said column for said upright shaft, a bearing hood on said bracket received about said upright shaft, a laterally extending shaft journaled in said bearing hood, driving connections under said bearing hood between said upright shaft and the inner end of said laterally extending shaft, said bearing hood comprising a bracket, a kitchen device, and a shaft therein, said last-named shaft and said laterally extending shaft provided with complemental connecting driving means, and said last-named bracket and the frame of said kitchen device provided with complemental connecting means.

12. In combination, a frame comprising a supporting column, a bracket extending therefrom, an upright shaft journaled therein, driving means at the upper end of said column for said upright shaft, a bearing hood on said bracket received about said upright shaft, a laterally extending shaft journaled in said bearing hood, driving connections under said bearing hood between said upright shaft and the inner end of said laterally extending shaft, said bearing hood comprising a bracket, a kitchen device provided with a discharge opening, a shaft therein, said last-named shaft and said laterally extending shaft provided with complemental connecting driving means, said last-named bracket and the frame of said kitchen device provided with complemental connecting means, a planetary member under said first-named bracket having drive connection with said upright shaft and arranged for having a beater supported thereby, a receiving bowl, and means for selectively positioning said receiving bowl under said planetary member or under said discharge opening.

In testimony whereof, I have hereunto signed my name in the presence of two subscribing witnesses.

PAUL S. WARD.

In presence of—
  PAUL V. CONNOLLY,
  DELMA WERNSING.